United States Patent
McFeeters

(10) Patent No.: US 8,121,273 B2
(45) Date of Patent: Feb. 21, 2012

(54) CALL INTERCEPTOR

(76) Inventor: Kenneth McFeeters, County Down (GB)

( * ) Notice: Subject to any disclaimer, the term of this patent is extended or adjusted under 35 U.S.C. 154(b) by 964 days.

(21) Appl. No.: 12/092,347

(22) PCT Filed: Nov. 1, 2006

(86) PCT No.: PCT/EP2006/010498
§ 371 (c)(1), (2), (4) Date: May 1, 2008

(87) PCT Pub. No.: WO2007/051609
PCT Pub. Date: May 10, 2007

(65) Prior Publication Data
US 2008/0292083 A1    Nov. 27, 2008

(30) Foreign Application Priority Data
Nov. 2, 2005 (GB) .................................... 0522358.1

(51) Int. Cl.
*H04M 11/00* (2006.01)

(52) U.S. Cl. ......... 379/100.16; 379/207.03; 379/100.01; 379/90.01

(58) Field of Classification Search ............. 379/100.16, 379/100.01, 100.05, 100.06, 100.07, 100.17, 379/210.02, 196, 207.13, 88.2, 903, 909, 379/100.08, 100.09, 142.07, 142.08; 358/1.15, 358/402, 407, 440
See application file for complete search history.

(56) References Cited

U.S. PATENT DOCUMENTS

| | | | |
|---|---|---|---|
| 5,467,388 A * | 11/1995 | Redd et al. | 379/210.02 |
| 6,442,249 B1 | 8/2002 | Miller, Jr. | |
| 7,480,065 B1 * | 1/2009 | Trandal et al. | 358/1.15 |
| 2002/0018546 A1 | 2/2002 | Horne | |
| 2003/0076941 A1 * | 4/2003 | Tiliks et al. | 379/196 |
| 2004/0001576 A1 | 1/2004 | Wang et al. | |
| 2004/0071292 A1 * | 4/2004 | Simpson et al. | 380/257 |

FOREIGN PATENT DOCUMENTS

| | | |
|---|---|---|
| DE | 20213466 U1 | 3/2003 |
| FR | 2799080 A1 | 3/2001 |
| GB | 2324224 A * | 10/1998 |

* cited by examiner

*Primary Examiner* — Melur Ramakrishnaiah
(74) *Attorney, Agent, or Firm* — Brooks Kushman P.C.

(57) ABSTRACT

An apparatus for selectively allowing calls to a device, especially a facsimile machine, that may receive calls on a signal line. The apparatus detects an incoming call on the signal line and allows the incoming call to reach the device if received during an enabled time period but prevents the incoming call from reaching the device if received outside the enabled time period. The apparatus may be configured to prevent a first incoming call, detected outside said enabled period, from reaching said device and subsequently to initiate said enabled time period.

17 Claims, 3 Drawing Sheets

FIG..1

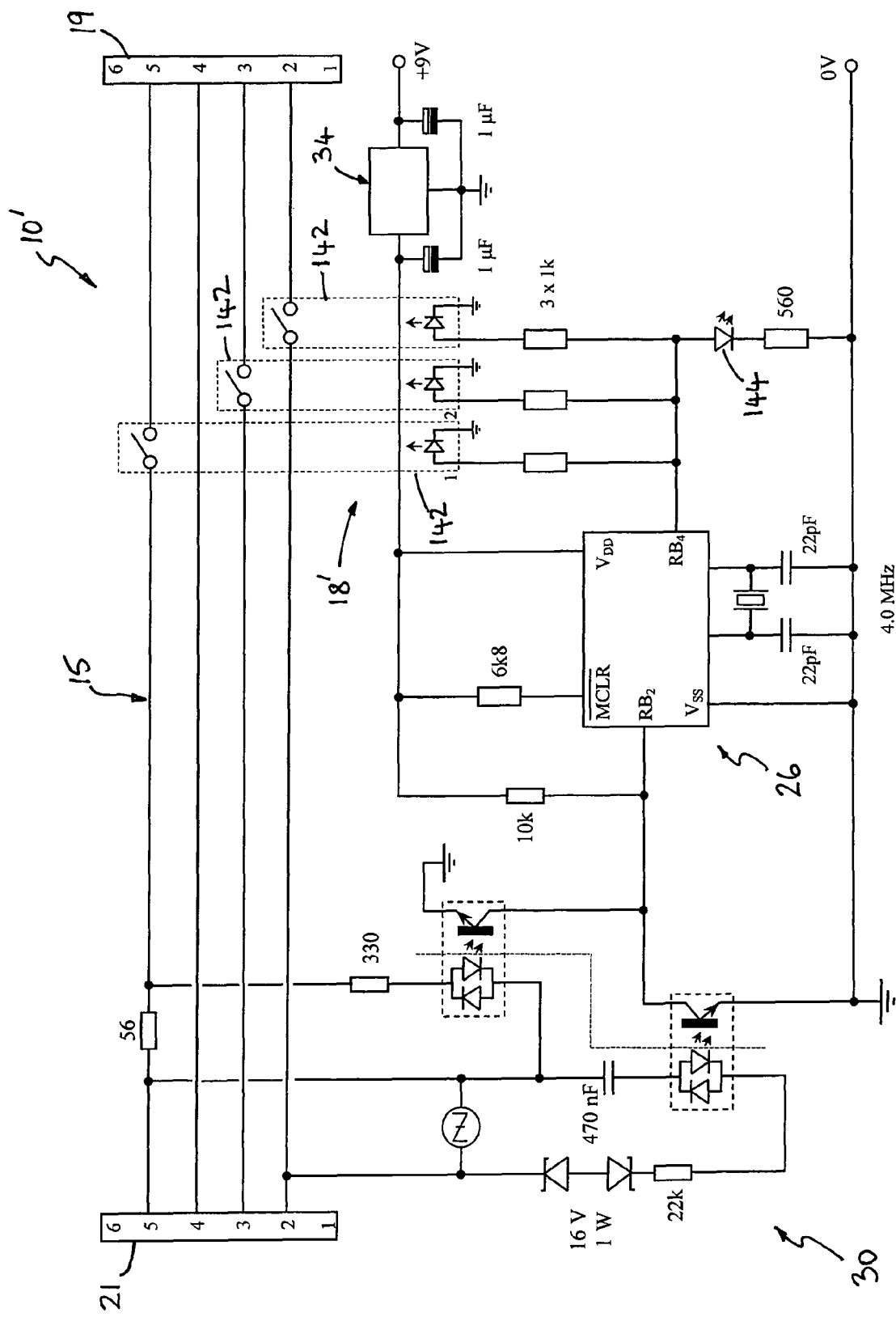
FIG..3

CALL INTERCEPTOR

FIELD OF THE INVENTION

The present invention relates to call interception and especially, but not exclusively, to the interception of facsimile transmissions.

BACKGROUND TO THE INVENTION

The receipt of unsolicited and unwanted facsimile transmissions (sometimes referred to as "spam" or "junk" transmissions) is an increasing problem. Spam transmissions are typically sent to a plurality of recipients by an automated machine that automatically dials a plurality of fax numbers, usually in sequence. Should the machine encounter a line that is busy, unanswered or otherwise unavailable, it abandons that particular call and moves on to the next fax number. The abandoned call is typically tried again at a later time.

SUMMARY OF THE INVENTION

Accordingly, a first aspect of the invention provides an apparatus for selectively allowing calls to a device that may receive calls on a signal line, the apparatus including means for detecting an incoming call on the signal line; and means for allowing the incoming call to reach the device if received during an enabled time period and preventing the incoming call from reaching the device if received outside the enabled time period.

In the preferred embodiment, the enabled time period is initiated in response to receiving a first incoming call after a quiescent period, outside of an enabled time period.

The apparatus may selectably block incoming calls by making or breaking the signal lines as appropriate, and/or by causing a signal to be sent on said signal line to the device sending the incoming call indicating that the receiving device is busy or otherwise unavailable (thereby effectively disabling the signal line).

The apparatus may adopt a normally enabled state in which the signal line is normally enabled (i.e. at least incoming calls are allowed to be received, the signal line being disabled (i.e. at least incoming calls are blocked by, for example, breaking the signal line or sending a busy/unavailable signal thereon) in response to detecting said first incoming call.

Alternatively, the apparatus may adopt a normally disabled state, the signal line being enabled only during said enabled time period.

The apparatus may include a switching device for selectably making or breaking the signal line.

A second aspect of the invention provides a method of selectively allowing calls to a device that may receive calls on a signal line, the method including detecting an incoming call on the signal line; allowing the incoming call to reach the device if received during an enabled time period; and preventing the incoming call from reaching the device if received outside the enabled time period.

In preferred embodiments, once a call has been received and allowed during the enabled time period, the signal line is enabled until the apparatus determines that the call has ended. This may be achieved by monitoring signal activity or voltages and/or currents on the signal line.

Preferred features are recited in the dependent claims and further advantageous aspects of the invention will become apparent to those ordinarily skilled in the art upon review of the following description of specific embodiments and with reference to the accompanying drawings.

BRIEF DESCRIPTION OF THE DRAWINGS

Embodiments of the invention are now described by way of example and with reference to the accompanying drawings in which like numerals are used to indicate like parts and in which:

FIG. 3 is a schematic diagram showing an alternative specific embodiment of the apparatus of FIG. 1.

DETAILED DESCRIPTION OF THE DRAWINGS

Figure 1:
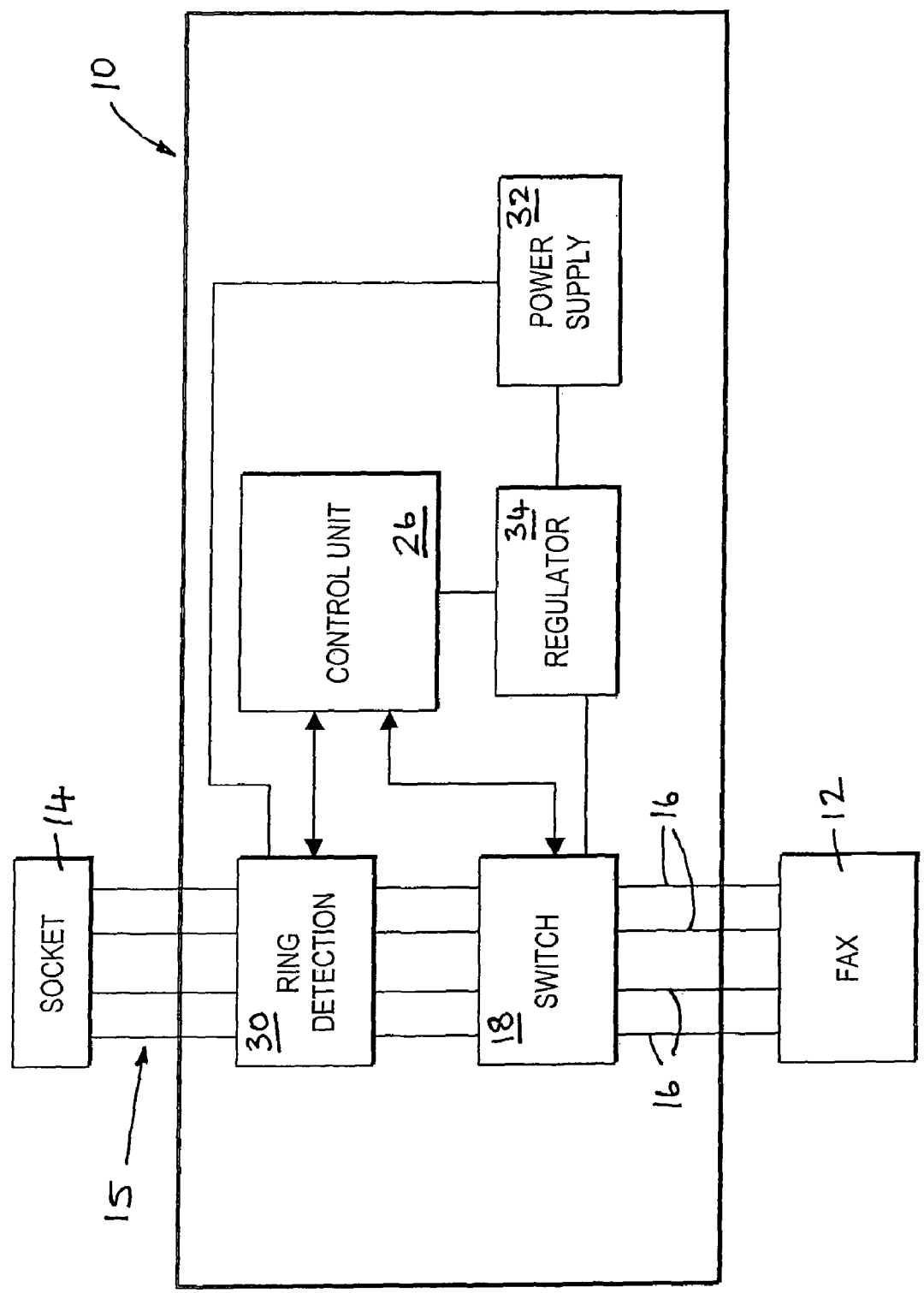
FIG. 1 is a block diagram showing an apparatus embodying the invention.

Referring now to the drawings, there is shown, generally indicated as 10, an embodiment of an apparatus for intercepting calls. The apparatus 10 is connectable between a call receiving device in the form of, for example, a facsimile machine 12, and a socket 14. The socket 14 provides a connection point to a communications network (not shown), for example a public standard telephone network (PSTN) and/or a computer network. Hence, the facsimile machine 12, or other device, may send and receive calls or transmissions to and from other devices (not shown) e.g. other facsimile machines, across the communications network. The term "calls" is intended to embrace any data transmission from one device to another and, in the present embodiment is particularly intended to embrace facsimile transmissions. In alternative embodiments, the call receiving device need not necessarily comprise a facsimile machine—it may comprise any device capable of receiving a call or data transmission on a line that can be blocked, especially a PSTN line or a mobile (cellular) telecommunications network line. For example, the call receiving device may comprise a telephone or computing device. Typically, the call receiving device is also capable of making outgoing calls.

In use, calls are sent between the socket 14 and the device 12 via a signal line 15. Calls typically take the form of electrical signals and so signal line 15 is typically provided by one or more electrical signal carriers or cables. In the case where the socket 14 provides a connection to a PSTN, the line 15 is typically provided by an electrical cable comprising 4 wires or carriers 16. During use, the line 15 provides part of a signal path between the device 12 and any one of said other devices connected to the network. In the examples described herein, the line 15 is assumed to be a conventional fax/phone line.

Conventionally, a fax line is provided by a cable connected directly between the socket 14 and the fax machine 12. When the apparatus 10 is installed, the line 15 is selectably connectable to the fax machine 12 via the apparatus 10 as is described in more detail below. Typically, the line 15 is carried between the socket 14 and the apparatus 10 by a first cable, and between the apparatus 10 and the fax machine 12 by a second cable, the apparatus 10 itself also providing part of the line 15. This can be seen from FIGS. 2 and 3 where the apparatus 10 includes signal carriers 16 which provide, in use, part of the signal line. The line 15 is provided between first and second connectors 19, 21, the first connector 19 be connected in use to socket 14 and the second connector 21 being connected in use to the device 12.

The apparatus 10 includes a switching device 18 which, when the apparatus 10 is installed, is incorporated into the line 15. In an open state, the switch device 18 breaks the line 15 thereby preventing calls from reaching, or being received by, the fax machine 12. In a closed state, the switch device 18 makes the line 15 so that calls are transmitted to, or received by, the fax machine 12.

Figure 2:
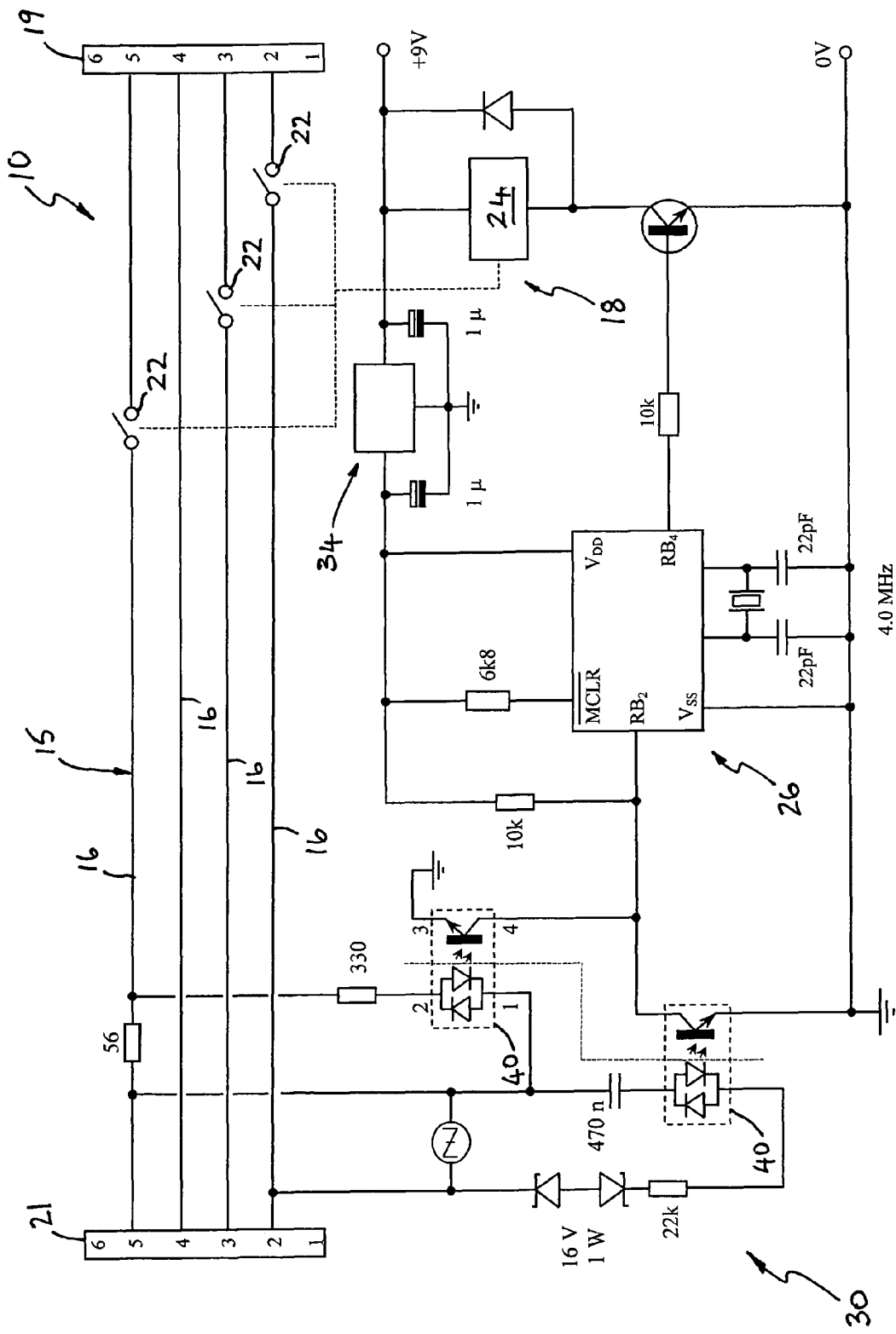
FIG. 2 is a schematic diagram showing a specific embodiment of the apparatus of FIG. 1.

FIG. 2 shows an embodiment of the switching device 18. The switching device 18 comprises a plurality of switch contacts 22 each controlled by a single relay device 24. For a conventional 4-wire fax line, a respective switch contact 22 is incorporated into 3 of the wires 16. Each switch contact 22 can make or break a respective wire 16 depending on the state of the relay device 24. Alternatively, each switch contact 22 may be operable by its own respective relay device (not illustrated).

A control unit 26 is provided for controlling the state of the switching device 18. In the embodiment of FIG. 2, the control unit 26 controls the switching device 18 by causing the relay 24 to be energised or de-energised by applying appropriate voltages to the relay 24, e.g. 5 volts to energise and 0 volts to de-energise. In the preferred embodiment, the switching device 18 adopts a normally closed state and so, in order to reduce power consumption, the relay 24 is advantageously arranged such that de-energisation corresponds to the closed state of switch contacts 22, while energisation corresponds to the open state.

The control unit 26 conveniently comprises a suitably programmed micro-controller, but may comprise any other suitable data processor, controller or digital logic circuit. The control unit preferably includes, or is associated with, a timer, conveniently a controllable pre-programmable timer (not shown).

The apparatus 10 further includes a ring, or line status, detection unit 30. The detection unit 30 is coupled to the line 15 in order to detect the presence of, in particular, an incoming or outgoing call. Conveniently, this may be achieved by monitoring the voltages or currents on the wires 16. When the detection unit 30 detects an incoming call, it sends a signal (e.g. a monostable pulse or a repetitive pulse train) to the control unit 26 thereby alerting the control unit 26 to the incoming call. In the preferred embodiment, the detection unit 30 is configured to monitor the line 15, to detect at least incoming calls and preferably to detect and distinguish between incoming and outgoing calls and to send a signal to the control unit 26 indicative of whether an incoming or outgoing call has been detected. This may be achieved by recognising respective signal (e.g. current and/or voltage) characteristics on the line 15. For example, an incoming call typically produces an oscillating signal on the line 15, whereas an outgoing call is typically preceded by a single step voltage change on the line 15 as the machine 12 transfers from an on-hook state to an off-hook state. Preferably, the detector 30 sends a signal to the controller 26 that is indicative of the signal detected on the line 15, and the controller 26 interprets the signal received from the detector 30 in accordance with its programming.

The apparatus 10 may include its own power supply 32 which may take the form of one or more batteries, or an isolated AC mains derived supply. A voltage regulator 34 may also be provided to ensure that an appropriate power supply is provided to at least some of the components of the apparatus 10 (e.g. the control unit 26 and the switching device 18 in the example of FIG. 1).

In use, the switching device 18 preferably adopts a normally closed state in which calls are allowed to be sent from and to be received by the fax machine 12. When a first incoming call is detected by the detection unit 30 after a quiescent period (outside of the time period during which calls are allowed), the control unit 26 is notified and causes the switching device 18 to open before the incoming call can be received by the fax machine 12. Hence, the call is prevented from reaching the fax machine 12 because the switching device 18 is open. Accordingly, the machine making the call determines that the fax machine 12 is unavailable, not answering or engaged and so terminates the attempted call.

The control unit 26 then causes the switching device 18 to adopt the closed state. For a predetermined, and preferably adjustable, period of time thereafter, the control unit 26 is programmed to take no action to block incoming calls. The control unit 26 may use the timer to determine the length of time for which incoming calls are allowed to reach the fax machine 12. Hence, the control unit 26 and the timer together create an enabled time period during which the switching device 18 remains closed and incoming calls are able to reach the fax machine 12.

When the detector 30 detects an outgoing call, the control unit 26 need take no action and the outgoing call is able to be transmitted.

In an alternative embodiment (not illustrated), the switching device 18 may be configured to adopt a normally open state, the control unit 26 being arranged to close the switching device 18 for a finite period of time after an initial call is blocked, and to close the switching device 18 whenever an outgoing call is detected.

In the preferred embodiment, the period of time for which incoming calls are allowed is set to be greater than the typical re-dial period for a conventional fax machine but less than the typical re-dial period for a typical automated "spamming" or junk fax machine. For example, conventional fax machines typically re-dial an engaged or unavailable number after approximately 3 minutes. Accordingly, the control unit 26 may be configured to allow incoming calls for, for example, approximately 5 minutes. Hence, when a conventional fax machine—which is assumed to be trying to send a genuine message to the fax machine 12—re-dials the number of the fax machine 12, the incoming call will now be received by the fax machine 12. Similarly, if a user manually re-dials the number of the fax machine while the switching device 18 is closed, then the re-sent call will be received. However, an automated "spamming" fax machine typically re-dials after a longer period—perhaps after one or more hours. It is probable, therefore, that when the spamming machine re-dials, its call is again treated as a first incoming call after a quiescent period and is therefore blocked by the switching device 18. The period for which incoming calls are allowed is preferably adjustable, for example for periods of between 1 and 10 minutes.

In preferred embodiments, once an incoming call reaches the machine 12, the controller 26 monitors the line 15, via the detector 30, in order to detect the end of the call. This may be achieved by detecting a quiescent state (i.e. the absence of signal activity) on the line 15 after the incoming call is received. To avoid mis-detection of the end of a call by interpreting say a pause in the call as the end of the call, the controller is programmable to only determine that the end of a call has occurred when activity on the line as ceased for at least a pre-determined period. If an allowed call lasts longer than the period for which incoming calls are allowed, then the controller 26 may be arranged to block the next call detected after the allowed call has ended. The controller 26 may be arranged to block the next call detected after an allowed call has ended, irrespective of whether or not the period for which incoming calls are allowed has expired.

Referring now in particular to FIG. 2, a specific embodiment of the detection unit 30 is shown by way of example. The detector 30 is electrically connected to the line 15 at two of the wires 16 in order to monitor signals present on the wires 16. The detector 30 is coupled to the controller 26 by means of opto-isolators 40 so that the detected line signals can be communicated to the controller 26 while the detector 30 is electrically isolated from the controller 26.

FIG. 3 shows an alternative embodiment of an apparatus for intercepting calls, generally indicated as 10'. The apparatus 10' is similar to the apparatus 10 with like numerals being used to indicate like parts. However, the apparatus 10' employs an alternative switching device 18' comprising FET (Field Effect Transistor) switches 142 rather than relay switches. The apparatus 10' operates in substantially the same manner as the apparatus 10. Either apparatus 10, 10' may include a lamp, e.g. an LED 144, for indicating the state of the switching device 18, 18'.

In FIGS. 2 and 3, conventional electrical and electronic symbols and notation are used to represent electrical and electronic components as will be understood by a skilled person. Any component values provided in FIGS. 2 and 3 are provided by way of example and are not limiting to the invention. It will be understood that the specific circuits shown in FIGS. 2 and 3 are provided as examples of how the apparatus of FIG. 1 may be implemented and that alternative implementations are possible, as would be apparent to a skilled person.

In the illustrated embodiment, the switching device 18 is presented as breaking the line 15 in order to block incoming calls. It will be understood that, in alternative embodiments (not illustrated), the apparatus may be arranged to block incoming calls in any other convenient manner. For example, the apparatus may include a device for sending a signal, via the line 15, to the sender of the incoming call indicating that the line 15 is busy or otherwise unavailable. The device may be included in the control unit, or be separate from but controlled by the control unit. Conveniently, the device is connected to the line 15 in order to place electrical signals thereon which simulate, say, a busy or unavailable condition. Alternatively, the device may be configured to transmit an audio or voice message on the line 15, for example in a manner similar to that of a fax/telephone answering machine. Alternatively still, the apparatus 10 may include means for selectably preventing the fax machine 12 from receiving an incoming call by, for example, preventing it from picking up the call. The sending fax machine may therefore receive a signal indicating that the fax machine 12 is not answering its call. In the embodiments envisaged above, it is preferred that the apparatus may also include a switching device having the same or similar in functionality to the switching devices 18, 18' described above.

In a further alternative embodiment, the apparatus may be arranged to create one or more enabled time periods which correspond to respective periods in a 24 hr clock cycle, calls being allowed to reach the device only if they are received during an enabled time period.

The invention is described herein in the context of facsimile transmissions but could equally be used in other applications, for example in blocking calls or texts to a telephone.

The invention is not limited be the embodiments described herein which may be modified or varied without departing from the scope of the invention.

The invention claimed is:

1. An apparatus for selectively allowing calls to a device that may receive calls on a signal line, the apparatus including means for detecting an incoming call on the signal line; and means for allowing the incoming call to reach the device if received during an enabled time period and preventing the incoming call from reaching the device if received outside the enabled time period; wherein the apparatus is arranged to prevent all first incoming calls detected outside said enabled period from reaching said device and subsequently to initiate said enabled time period during which all incoming calls are allowed.

2. An apparatus as claimed in claim 1, wherein said means for allowing or preventing incoming calls includes a switching device arranged to make said signal line during said enabled time period and to break said signal line outside of said enabled time period.

3. An apparatus as claimed in claim 2, wherein said switching device is arranged to break said signal line only when said detecting means indicates that any allowed incoming calls have ended.

4. An apparatus as claimed in claim 2, wherein said signal line comprises at least one signal carrier, said switching device including at least one switching contact incorporated into said at least one signal carrier, said at least one switching contact being operable between an open state and a closed state in which said at least one signal carrier is broken or made respectively.

5. An apparatus as claimed in claim 1, wherein the apparatus includes means for sending a signal on said signal line which signal indicates that said device is unable to receive an incoming call.

6. An apparatus as claimed in claim 5, wherein said signal indicates that said signal line is engaged.

7. An apparatus as claimed in claim 5, wherein said signal comprises an audio message.

8. An apparatus as claimed in claim 5, wherein said signal sending means is arranged to send said signal in response to detection of a first incoming call outside of said enable period.

9. An apparatus as claimed in claim 1, wherein said detecting means comprises a detection apparatus arranged to monitor signals on said signal line and to generate an output signal indicative of signals detected on said signal line.

10. An apparatus as claimed in claim 9, wherein said detection apparatus is arranged to monitor electrical signals on said signal line.

11. An apparatus as claimed in claim 1, wherein said means for allowing or preventing calls includes a control unit which includes or is associated with means for creating said enabled time period.

12. An apparatus as claimed in claim 11, wherein said control unit is arranged to receive from said detection means a signal indicating that an incoming call is detected on the signal line.

13. An apparatus as claimed in claim 12, wherein said signal is communicated from said detection means to said control unit by means of one or more opto-isolators.

14. An apparatus as claimed in claim 11, wherein said means for allowing or preventing incoming calls further includes a switching device arranged to make said signal line during said enabled time period and to break said signal line outside of said enabled time period; and
wherein said control unit is arranged to control the operation of said switching device.

15. An apparatus as claimed in claim 1, wherein said call receiving device comprises a facsimile machine.

16. An apparatus as claimed in claim 1, wherein said signal line comprises a telephone line, such as a public standard telephone network (PSTN) line or a mobile (cellular) telephone network line.

17. An apparatus as claimed in claim 1, wherein said apparatus includes at least one signal carrier which, in use, forms part of said signal line.

* * * * *